(12) United States Patent
Foley et al.

(10) Patent No.: US 6,766,685 B2
(45) Date of Patent: Jul. 27, 2004

(54) METHOD OF SENSING AND CORRECTING BRAKE FUNCTIONS IN MOVING HEAVY TRUCK BRAKE SYSTEMS USING INSTRUMENTED ANCHOR PINS

(76) Inventors: Timothy B. Foley, 1017 Redtail Rd., Audubon, PA (US) 19403; Robert S. Turzanski, 216 Heatherfield Dr., Souderton, PA (US) 18964

( * ) Notice: Subject to any disclaimer, the term of this patent is extended or adjusted under 35 U.S.C. 154(b) by 0 days.

(21) Appl. No.: 10/349,456

(22) Filed: Jan. 22, 2003

(65) Prior Publication Data

US 2003/0106369 A1 Jun. 12, 2003

Related U.S. Application Data

(63) Continuation of application No. 09/977,024, filed on Aug. 31, 2001, now abandoned.

(51) Int. Cl.[7] .............................................. G01M 15/00
(52) U.S. Cl. .......................................... 73/129; 73/121
(58) Field of Search .......................... 73/121, 128, 129, 73/130, 131; 701/29, 30, 31, 70, 1; 340/438, 453, 454

(56) References Cited

U.S. PATENT DOCUMENTS

| | | | | |
|---|---|---|---|---|
| 3,365,689 A | * | 1/1968 | Kutsay ........................... 338/5 |
| 3,695,096 A | * | 10/1972 | Kutsay ........................... 73/761 |
| 3,703,826 A | * | 11/1972 | Burke ............................ 73/121 |
| 3,782,185 A | * | 1/1974 | Hassenauer et al. ........... 73/121 |
| 4,804,053 A | * | 2/1989 | Nordstrom .................... 177/211 |
| 4,893,242 A | * | 1/1990 | Rogers et al. ................. 701/70 |
| 5,215,154 A | * | 6/1993 | Kirby .......................... 177/136 |
| 5,230,242 A | * | 7/1993 | Colarelli, III ................. 73/122 |
| 5,279,394 A | * | 1/1994 | Wollenweber et al. .. 188/1.11 E |
| 5,379,636 A | * | 1/1995 | Colarelli, III ................. 73/122 |
| 5,524,735 A | * | 6/1996 | Gee ............................. 188/330 |
| 5,563,355 A | * | 10/1996 | Pluta et al. ............. 73/862.625 |
| 5,964,511 A | * | 10/1999 | Miyazaki ...................... 303/191 |
| 5,979,613 A | * | 11/1999 | Towers et al. ............ 188/181 T |
| 6,408,688 B2 | * | 6/2002 | Foley et al. ................... 73/129 |

\* cited by examiner

*Primary Examiner*—Eric S. McCall
(74) *Attorney, Agent, or Firm*—Frank J. Benasutti

(57) ABSTRACT

A force detecting load cell, which is designed to be a direct replacement for existing anchor pins, is used as the load-bearing member and measuring and diagnostic device in brake systems. The working dimensions of the cell and the parts replaced are the same, except that the cell has short zones of decreased diameter so that strains are concentrated in these zones. Electrical strain gages are positioned within these zones with connections to exterior measuring and monitoring instrumentation. The arrangement and orientation of the gages in the concentrating zones permit measurement of the applied brake loads both as to magnitude and direction, which the vehicle having the brake system is being operated and moving, i.e., being driven.

1 Claim, 6 Drawing Sheets

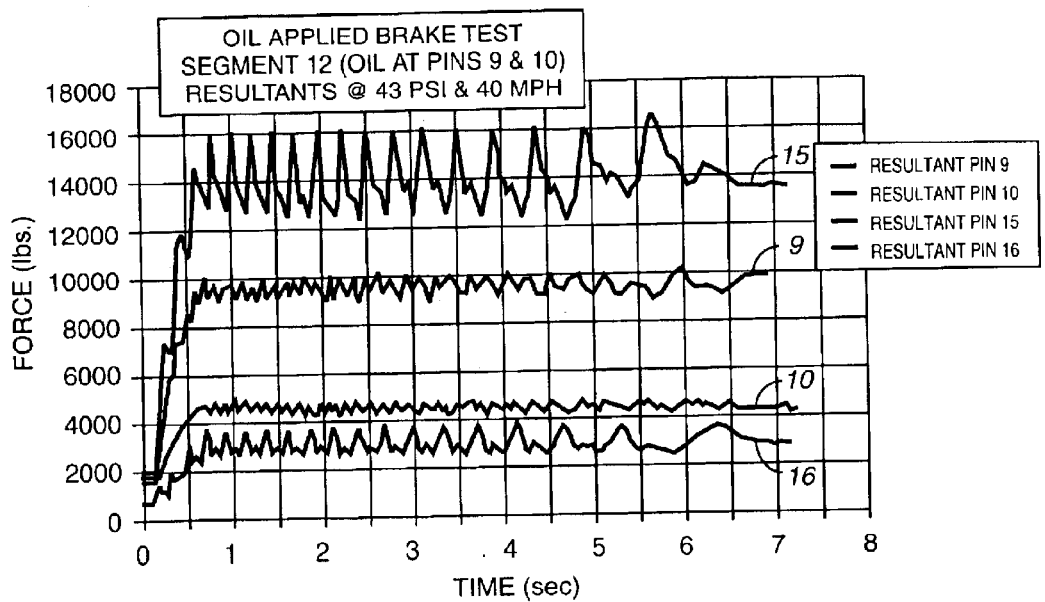
FIG. 3
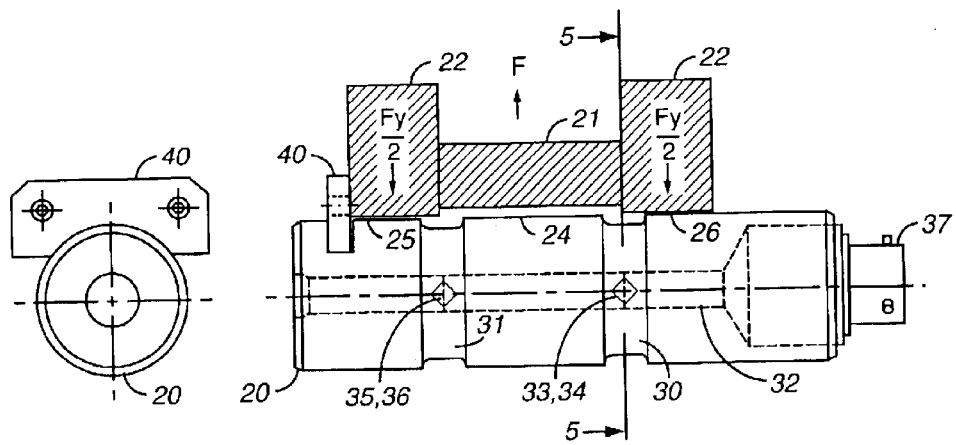
FIG. 4A  FIG. 4
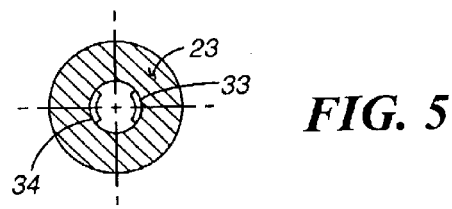
FIG. 5

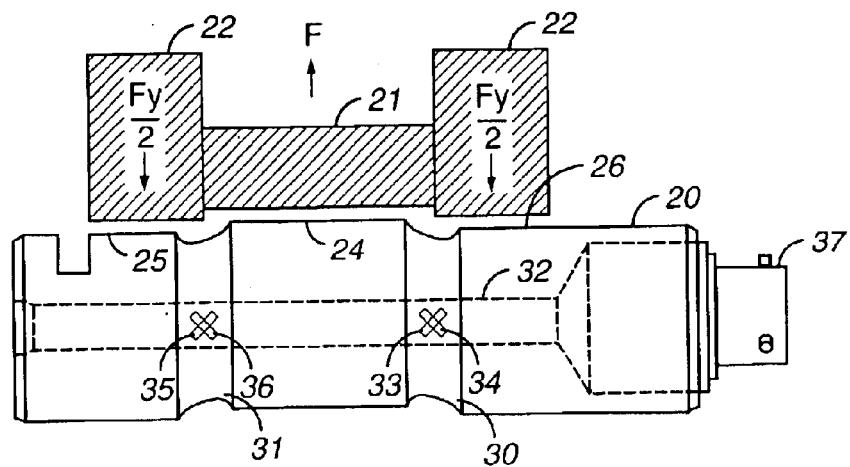
FIG. 6
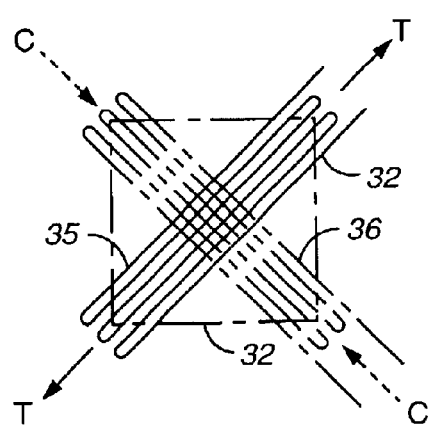 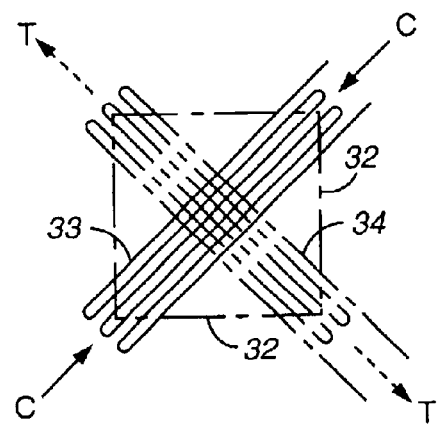
FIG. 6A          FIG. 6B

METHOD OF SENSING AND CORRECTING BRAKE FUNCTIONS IN MOVING HEAVY TRUCK BRAKE SYSTEMS USING INSTRUMENTED ANCHOR PINS

CROSS-REFERENCE TO RELATED APPLICATIONS

This application is a continuation of our prior application Ser. No. 09/977,024, filed Aug. 31, 2001 now abandoned, the disclosure of which is incorporated herein by reference as if fully set forth.

BACKGROUND OF THE INVENTION

1. Field of the Invention

This invention relates to brake systems and, more particularly, to improvements in force and torque measuring apparatus for brakes and their use in brake systems; with particular reference to heavy truck brake systems in use in vehicles which are being driven.

2. Description of the Prior Art

In the prior art, it is known that brake systems, including individual brakes or brakes operating in combination with one another are subjected to variations in adjustment, wear and tear as well as to problems relating to the environment in which they are used. Thus braking forces become uneven and in some cases unpredictable. An example would be where oil leakage occurs and slicks up the surfaces in a particular brake on a particular wheel, causing it to react differently than the other brakes.

Also in the prior art, it was known to test brakes or to apply testing apparatus to the brakes for specific purposes. Such apparatuses were applied; then the test would be run; and then the apparatuses were removed; and then the brakes were put back on together with the wheels; and finally the truck was put back into service. For example, in U.S. Pat. No. 3,703,826, a gauge is clamped on and a measurement is taken. It is then removed and entirely replaced. Gauges were not, however, used as part of the operating running system on moving vehicles to collect and analyze data on a regular basis.

U.S. Pat. No. 5,215,154 shows a method and apparatus for determining the weight of the vehicle or the power output of its engine which comprises measuring either or both of acceleration and velocity of the vehicle, measuring the force causing the acceleration and velocity by measuring deformation or displacement of a drive train member, and then evaluating the weight of the vehicle from the measurements of acceleration and force and the engine power output from the measurements of velocity and force.

In the prior art of measuring, it is known to provide strain detecting load cells which are adapted to replace or be readily interchangeable with couplings such as pins or bolts. See, for example, the Kutsay U.S. Pat. Nos. 3,695,096 and 3,365,689.

Current braking systems used on most heavy trucks are reliable and effective systems. However, defects can occur as the components are worn through continued use, which can cause degraded brake performance and effectiveness.

Thus, a low-cost method to detect and measure the wheel-to-wheel and axle-to-axle differences in brake force/torque is desired.

Tests performed using experimental instrumented anchor pin models established that a clear correlation exists between the force sensing anchor pins and the actual torque produced at the brake FIG. 1.

In heavy truck brake systems the anchor pins and brake shoe rollers react to the load as the brakes are applied during brake stops of moving vehicles. Operational forces from the pressure of brake applications and the force generated from the torque due to brake drum/shoe friction are transferred to the brake anchor pins and rollers. These forces produce a stress on the anchor pins and rollers. By means of an internal strain gauged anchor pin, this shear stress can be instantaneously and continually measured by monitoring an electrical signal in response to the applied load. This signal can be used to evaluate brake performance and effectiveness, thereby alerting the driver of brake system malfunctions or potential problems.

In dealing with many other types of brake force/torque measuring techniques, determination of forces require excessive modifications or costly attachments carrying gauges or some other measurement device. In most cases these attachments are not for operational use and do not measure brake forces in dynamic over-the-road conditions. In addition, brake system spatial limitations and operational conditions have prevented successful application of conventional strain gauge equipment and other measuring equipment. Principal factors have included undue complication and costs, requirement for radical design changes in the tested apparatus to provide additional clearances and/or protection for gauges, difficulty of installation, practical impossibility of accurate calibration in the field, and lack of available means to detect the angle of an applied load as well as its magnitude.

In view of the above, an object of the present invention is to provide a force measuring device for use in moving vehicles, which is adapted to replace and be readily interchangeable with the existing anchor pins, such as those produced by Rockwell International Corporation, 3135 West Maple Road, Troy, Mich., numbers 1259-N-252 and 1259-N-274 currently used in most "P" & "Q" style brake systems of heavy trucks.

A further object is to provide a brake monitoring system which utilizes force sensing anchor pins, of the above type, to detect brake system out of adjustment and misalignment.

A further object is to provide a brake monitoring system that utilizes force sensing anchor pins to detect brake system malfunctions and failures in moving vehicles.

A further object is to provide a brake monitoring system which utilizes force sensing anchor pins to detect the presence of foreign substances such as oil, grease, or gear lube.

A further object is to provide a force/torque measuring pin of the above type which is formed with measurement zones of reduced external diameters within the bearing surface area, whereby shear strains produced in the pin by forces applied to the bearing surface areas are concentrated in the measurement zones.

A further object is to provide a force/torque measuring pin of the above nature formed with a axial bore, and including a plurality of electrical strain gauges attached to the circumferential surface of the bore within the zones of shear concentration.

A further object is to provide a pivotal force transducer including a combination of internal strain gauges to detect simultaneously the mutually perpendicular radial components of the shear strain produced by components of a force angularity applied to the transducer during brake stops, whereby the magnitude of the total applied braking force, and the application angle of the forces may be ascertained.

Other objects and advantages of the invention will become more apparent from the following description and accompanying drawings forming part of the application.

SUMMARY OF THE INVENTION

We have invented a way of systematically making wheel to wheel force/torque comparisons for operating, that is, moving heavy trucks which are being driven in order to determine whether there is any degradation in brake system performance; thus, allowing for corrective action.

In particular we provide a force and torque measuring apparatus for use in heavy truck brake systems on vehicles which are being driven, comprising an anchor pin means as part of the load-bearing members, said anchor pin means having a plurality of force detecting load cells and measuring devices within said truck brakes; exterior measuring and monitoring instrumentation means; and connection means connected to said anchor pin means and said instrumentation means to permit measurement of the applied brake loads during operation of the vehicle as aforesaid, both as to magnitude and direction.

We also provide such an apparatus wherein the cells have working dimensions comprising short zones of decreased diameter so that strains are concentrated in these zones; and electrical strain gages are positioned within these zones connected to said connecting means to effect said measurements.

In accordance with our invention, we provide a method of sensing and correcting brake function in heavy truck brake systems in use in operating moving vehicles being driven over the road, comprising the steps of systematically making wheel to wheel force/torque comparisons in operating heavy trucks in order to determine whether there is any degradation in brake system performance; and then taking corrective action based on those comparisons.

For use in an operating vehicle having brakes as part of an operating brake system, we provide a force and torque measuring apparatus for use in said system, comprising: load bearing members; an anchor pin means as part of the load-bearing members; said anchor pin means having a plurality of force detecting load cells and measuring devices within said brakes; exterior measuring and monitoring instrumentation means; and connection means connected to said anchor pin means and said instrumentation means to permit measurement of the applied brake loads as to either magnitude or direction or both, during vehicle and brake system operation. The cells have working dimensions comprising short zones of decreased diameter so that strains are concentrated in these zones; and electrical strain gages are positioned within these zones connected to said connecting means to effect said measurements. The anchor pins are oriented with respect to a predetermined reference point in order to obtain the applied brake load direction.

The apparatus may further comprise incorporating an indication means in said vehicle and connected to said system to convey real-time system performance to the operator.

The apparatus may comprise using a processing means connected to said system to analyze and determine individual brake system performance and generate a warning when performance is reduced to a predetermined reference value.

For use in connection with an operating vehicle having wheels and brakes in a brake system, we have invented a method of sensing and correcting brake function in said system, comprising the steps of systematically making wheel to wheel force/torque comparisons during operation of said vehicle and brake system in order to determine whether there is any degradation in brake system performance; and then taking corrective action based on those comparisons. The method further comprises using a means of correction verification to verify manual brake adjustments through an additional processing correction adjustments. We provide a method of sensing and monitoring individual brake performance over time in operating heavy truck brake systems in order to determine any degradation in brake system performance; and then taking corrective action based on the performance history. This method may include a processing means to analyze and determine wheel to wheel force/torque comparisons and generate a warning when wheel to wheel differences become unbalanced to a predetermined reference value.

The thrust of applicant's invention is to use the truck brake testing and monitoring system on a continuous in-service basis. To that end, the invention does not impact on the normal operation of the brake system; that is, it does not make a change in that system. In accordance with the applicants' invention, brakes may be tested continuously during the normal in-service operation of a vehicle, because the existing anchor pin is replaced with their anchor pin. Thus, test results can be monitored continuously, just like a brake light which comes on when one steps on the brake pedal. Prior art systems relate only to separate brake tests on parked vehicles.

Brake performance is the overall ability to stop the vehicle in a desired amount of time. This means that in accordance with the present invention, the entire vehicle brake system is evaluated, instantaneously and simultaneously, not just one component or section at a time. The instrumented anchor pin of the present invention senses or measures the force on the anchor due to the reactive torque generated by the drums and brake pads during a braking event. This provides the ability to determine the actual torque developed at each wheel. This information is desired for several reasons:

a. To instantaneously perform wheel-to-wheel comparisons to establish balanced braking;

b. To provide real-time status of the braking performance (i.e., stopping ability), at each wheel, simultaneously; and c. To provide the ability to identify brake malfunctions such as oil/grease on the pad linings, brake adjustments out of specification, or loss of air pressure, at each brake location, simultaneously.

"Operation" as that term is used to describe the present invention, is defined as normal, every day, over-the-road, in service operation. "Operation" does not mean activating the brakes in a controlled test environment. The invention does not make a change in the normal operation of the brake system and can be used as a permanent feature of the truck.

Further, the method of sensing and correcting the brake function is a method in that "operating" system. It comprises making wheel to wheel force/torque comparison during "operation" of the vehicle.

The description of the invention relates to such an operating system.

Correction verification can be done at any time either during truck (vehicle) operation. The present invention will measure brake performance conditions on a continuous basis. The invention provides constant force monitoring and is not dependent on an attachable test device or remote test site.

The clamp-on system of the prior art, such as U.S. Pat. No. 3,703,826 to Burke can only be used at a test station, and is not applicable for every day performance monitoring. It only measures the spreading force of brake shoes. The device does not account for many other brake performance variables such as lining, alignment, or drum to shoe interface.

Vehicle brake system performance is evaluated instantaneously and simultaneously at all brake locations, not just one component or section at a time. Burke only measures the force to push brake pads apart. Burke does not account for different brake linings, wear, or other damage that might affect brake performance (brake torque/stopping power).

BRIEF DESCRIPTION OF THE DRAWINGS

FIG. 3 is a chart presenting test data which illustrates the reduction in brake effectiveness due to the application of gear lube to the brake drum.

FIG. 4 is a longitudinal view of a device in accordance with our invention shown as installed in a typical brake shoe and brake spider section.

FIG. 4a is an end view of the device shown in FIG. 4.

FIG. 5 is a cross-sectional view of the device shown in FIG. 4 taken along the plane 5—5 of FIG. 4.

FIG. 6 is a longitudinal view illustrating typical gage and force relationships occurring in the combination shown in FIG. 4.

FIGS. 6a and 6b are illustrations of the gage elements under shear as applied in FIG. 6.

DESCRIPTION OF THE PREFERRED EMBODIMENTS

Figure 1:
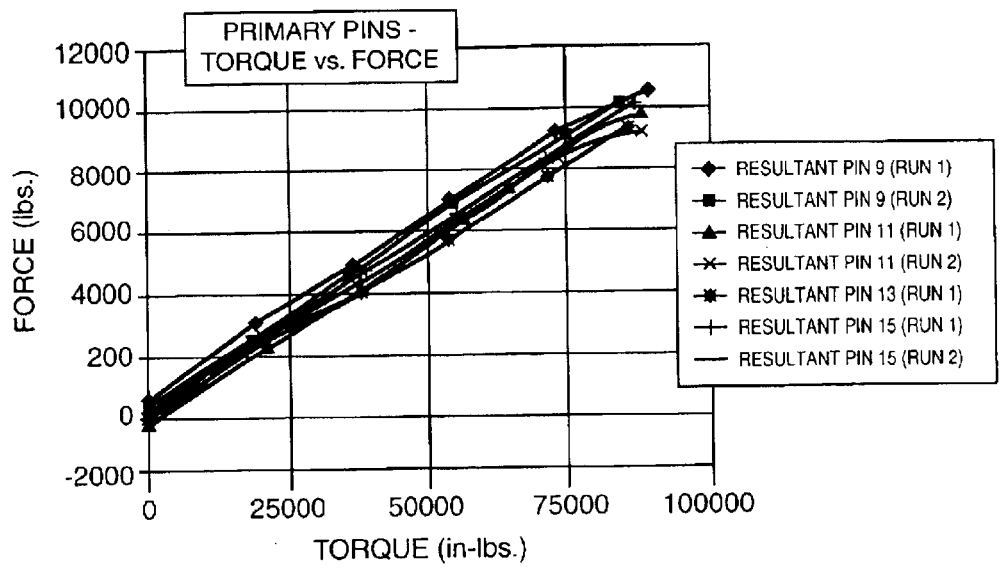
FIG. 1 is a chart presenting test data that illustrates the linear relationship between primary anchor pin force and torque applied to the brake drum.
Figure 2:
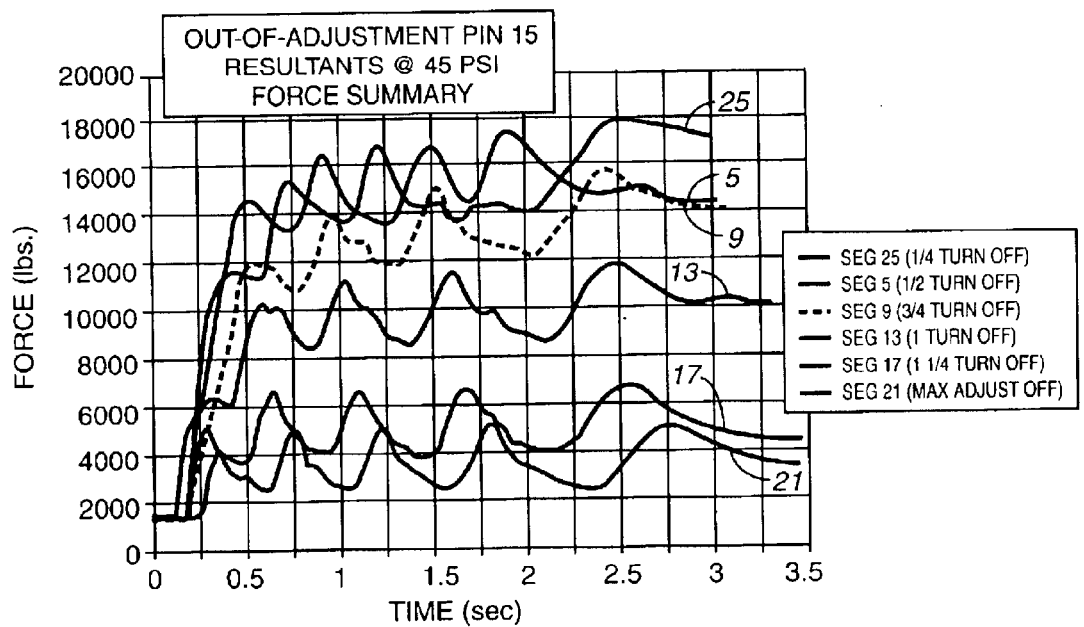
FIG. 2 is a chart presenting test data that illustrates that as the brake rod stroke is increased or becomes more out-of-adjustment, the brake effectiveness or brake force is continuously decreased.

In accordance with our invention, for example, tests can be done on heavy trucks, such as those used in fleets, by replacing the standard pins with pins in accordance with our invention. Measurements can be taken every time the brakes are applied (referred to as "brake stop" measurements). The results are shown of actual tests in the chart FIG. 2 which shows that the pin FIG. 4 displayed decreases in brake effectiveness as the brakes are taken out of adjustment. This is noted as the Resultant Pin #15 in FIG. 2.

This will lead to an examination of the brake adjustment mechanisms such as the slack adjuster; which can then be readjusted to optimum settings.

Furthermore, the next time the truck brakes are used, the instrumentation will read out immediately; so that diagnostically a check can be made instantly as to whether or not the correction actually was effective.

Referring to FIGS. 4, 4a, and 5 the numeral 20 denotes an instrumented anchor pin adapted to act as a transducer for a force F between a brake shoe rib 22 and the brake spider section 21, and which can be substituted for the existing anchor pin. The force-transmitting element of the pin comprises a generally cylindrical body 23 formed with a middle peripheral surface area 24 engaging the brake spider section 21, and flanking surface areas 25 and 26 similarly engaging the brake shoe ribs 22. In accordance with normal practice, the tolerances between the parts are selected to prevent binding and to permit easy assembly and disassembly, while maximizing measurement accuracy.

Returning to FIG. 4, it will be seen that the middle working surface portion or area 24 of the body 23 is separated longitudinally from the flanking surface area portions 25 and 26 by narrow zones 30 and 31 of reduced diameter, these zones span the regions at the interface locations between brake shoe ribs 22 and the spider section 21. It will be evident that when a force F is transmitted from the brake shoe ribs 22 to the spider section 21 by the instrumented anchor pin 20, thus placing the latter in shear, the reduced diameters of the zones 30 and 31 cause the shearing stress and consequent strains to be concentrated therein, these effects being illustrated in exaggerated form in FIG. 6.

The cell body 23 is provided with an axial bore 32. In the form of the device shown in FIGS. 4 and 5 wherein the force F is fixed at one axis of known direction but of unknown magnitude, two strain gages 33 and 34 are bonded to the circumferential surface of the bore 32 in the concentration zone 30. These gages are situated opposite each other in diametrical alignment at right angles to the known direction of the force F by means of an anti-rotation device 40, as shown in FIG. 5. Thus the maximum response of the gaging combination to the applied force is uniformly available to measure the magnitude of the force without regard to changes in the angle of application. The gages 33 and 34 are arranged with their sensing direction at 45 degrees relative to the longitudinal axis of the body 23, but at 90 degrees or crisscross relation to each other. A second pair of gages 35 and 36 is similarly disposed in the zone 31. Exterior connections from the gage units are provided through a suitable connector or sealed fitting 37 (FIG. 6) and flexible multiconductor cable 38 as shown on FIG. 7.

Figure 7:
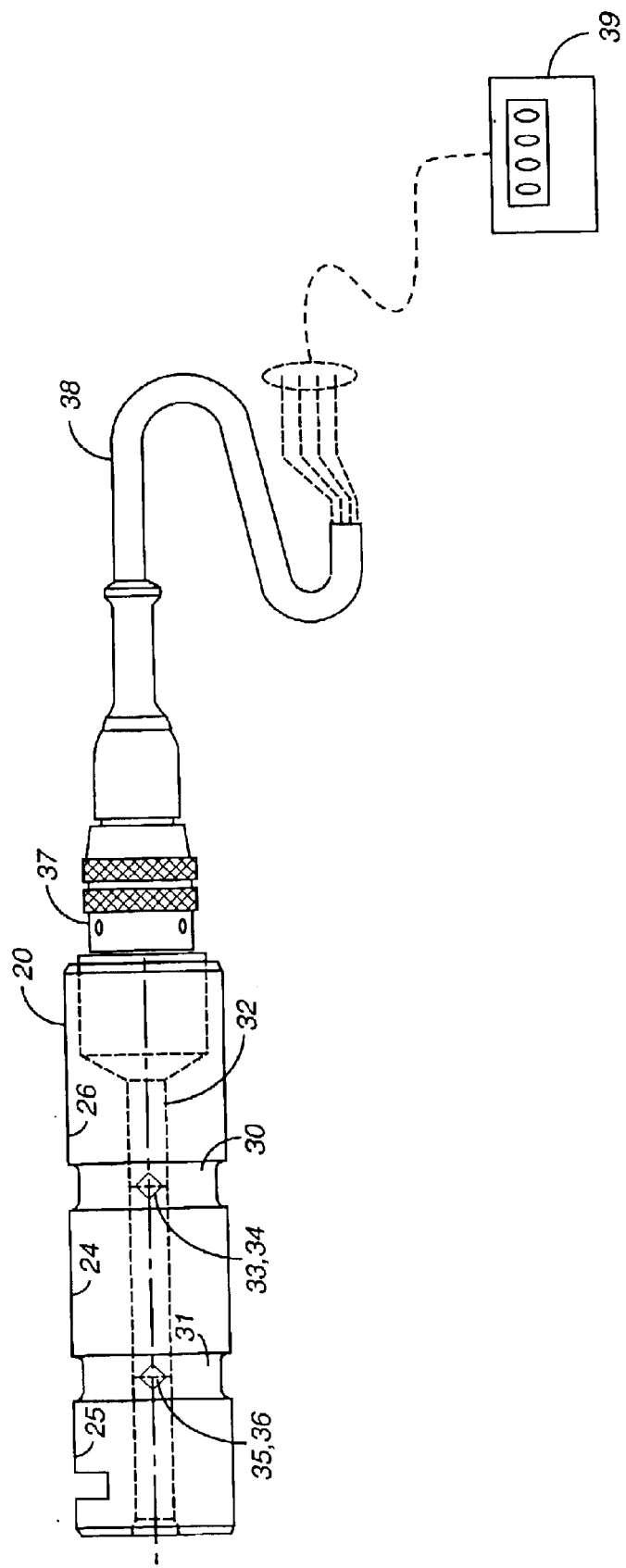
FIG. 7 is an overall plan view illustrating the connection of exterior instrumentation to the device shown in FIGS. 4 and 6.

Referring to FIG. 6, it will be observed that the force F applied to the middle working surface 24 of the body 23 is opposed by joint resisting forces F/2, F/2 applied to the flanking surfaces 25, 26. This force relationship sets up shearing stresses and resulting strains or distortions in the concentrating zones 30 and 31. U.S. Pat. No. 3,365,689, granted to Ali Umit Kutsay, includes an extensive explanation of gaging geometry and electrical connections for shear force measurements, hence these details are not repeated herein except to note, in connection with FIGS. 6a and 6b, that the distortion shown in FIG. 6 changes the gage-holding elements of the bore surface 32 from their normally rectangular shape to the rhombic form illustrated. Thus when strain gages 33 and 36 are in compression C, the gages 34 and 35 will be under tension T. The gages are electrically joined via the connector 37 and cable 38 to exterior elements forming therewith the usual Wheatstone bridge type of measuring circuit, the exterior portion of the apparatus being indicated diagrammatically herein by the block 39 as shown in FIG. 7. The signals set up by the above noted strains in the gages cooperate to effect the characteristic bridge unbalance and consequent measuring indication of the applied force F.

The apparatus combination 39 may embody either simple indicating means or recording means, as desired. With regard to the Wheatstone bridge circuits mentioned, the various zero balance, temperature compensation, and bridge sensitivity resistors R etc., required for use with a particular gage assembly, may be sealed or "potted" within the bore 32 (FIG. 6). In addition to the protection afforded the parts, this arrangement provides a load cell unit combination which is self-contained to a large degree, thus obviously promoting simplicity in installation, stability of calibration, and ready employment with a minimum of exterior instrumentation requirements.

The foregoing embodiment, as noted, is particularly applicable to load measurement at a pin joint wherein the known direction of the applied force is fixed on one axis or has relatively small variations in load direction, thus allowing the cell to be retained in fixed position with its gages orientated for maximum response in a given direction.

Figure 8:
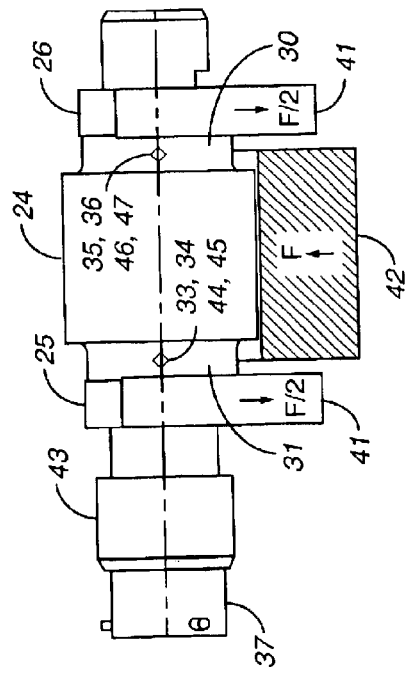
FIG. 8 is a longitudinal view illustrating an alternative (two-axis force sensing) version of the apparatus shown in FIG. 4.
Figure 9:
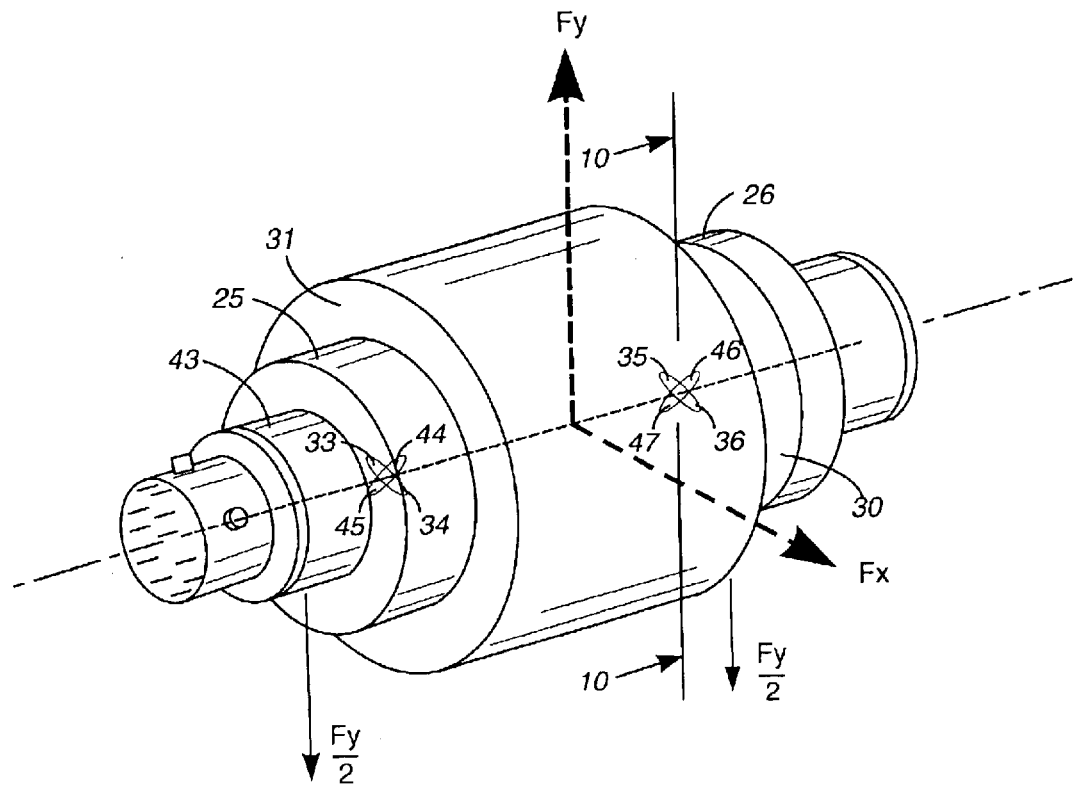
FIG. 9 is an isometric loading diagram of a device in accordance with our invention subjected to brake forces applied at an unknown angle and/or of unknown magnitude.
Figure 10:
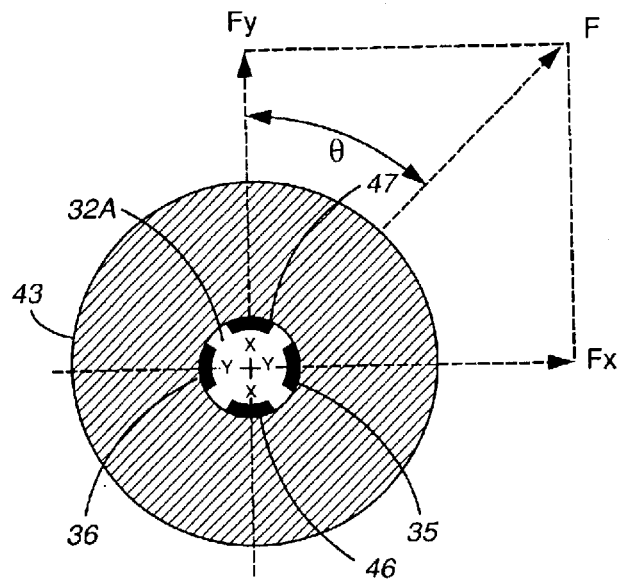
FIG. 10 is an illustration in cross section showing the typical relationship between force components and gage arrangement in the embodiment shown in FIG. 9.

Under a second set of circumstances, wherein both the amount of the applied force and its direction are variable and hence unknown, a two-axis sensing arrangement shown in FIGS. 8 and 9 should be employed. This condition consists of a situation in which a force of unknown magnitude is applied to a pin joint in an unknown radial direction, and in which it is desired to ascertain both the magnitude and direction of the load simultaneously. For this purpose, the present invention provides the means as typified by the embodiment shown in FIGS. 8 and 9. In the embodiment illustrated, the joint structure consists of the brake shoe ribs 41 and the central spider 42 is articulated by means of a cylindrical load cell 43. As previously noted, the cell may constitute a temporary gaging replacement for a normally used anchor pin of identical essential working dimensions, or may if desired be itself employed as a permanent working component. For the subsequent analysis of the angular direction of force application, the reference line is taken as the vertical through the axial center of the load cell 43 as shown in FIG. 10. This line is indicated as the Y-axis of coordinates. Using the same coordinate convention, the horizontal diametral direction through the cell center is indicated as the X-axis in FIG. 10.

Figure 11:
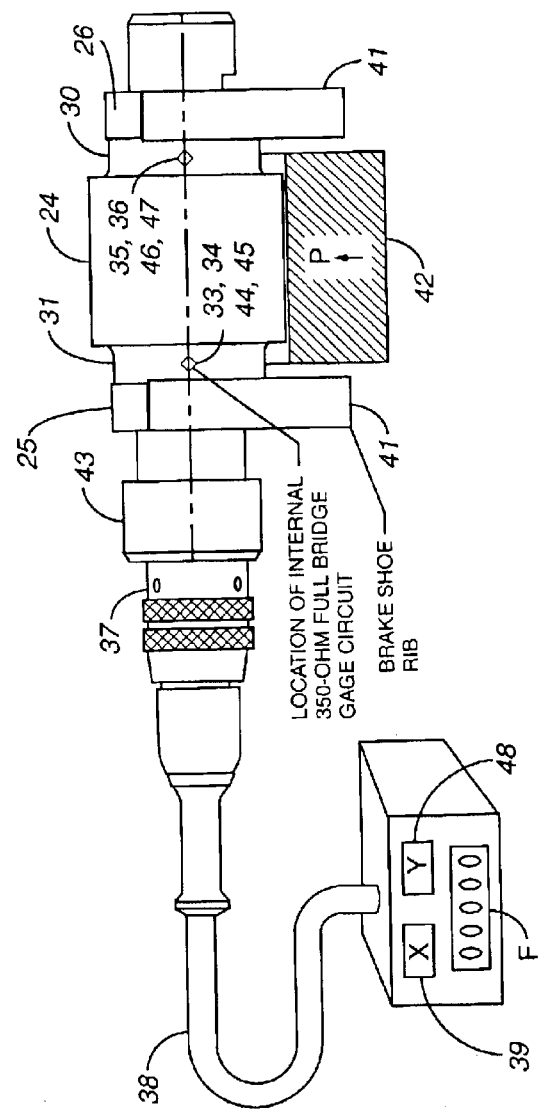
FIG. 11 is an overall plan view indicating typical electrical connections to exterior instrumentation for the embodiment shown in FIGS. 8 to 10.

The bore 32a of the cell body 43 has secured therein the same combinational set of gages 33, 34, 35 and 36 as previously described for the embodiment shown in FIG. 4 and the gages are similarly arranged to detect strains due to a force operation in a vertical direction, and the measured result is indicated by a Wheatstone bridge metering unit 39 as shown in FIG. 11. The bore 32a also contains a second set of gages 44, 45, 46, and 47. This second combination is the same in gage content and interrelation as the above-described first set, but its bonded position in the bore is displaced circumferentially by 90 degrees from that of the first set. As a result, the second set of gages is responsive to horizontal rather than vertical forces. The gages 44, 45, etc., of the second set are connected into a second Wheatstone bridge metering combination 48, of FIG. 11, generally identical to the apparatus 39 but having no electrical connection therewith. At this point it is appropriate to note that vertical or Y-axis directional forces do not per se produce any indication by the metering unit 48, since the effects of such forces on the vertically aligned gages 44, 45, etc., are equal throughout and hence cancel each other in the bridge circuit. Similarly, horizontal or X-axis forces have no effect on the first metering unit 39, their entire significant effect being measured by the second unit 48. In view of the above relationships, for clarity and brevity in subsequent explanation, the metering combinations 39 and 48 may conveniently be referred to as the Y-meter and X-meter, respectively.

In a typical operation, referring to FIG. 9 in which a force F of unknown magnitude is applied radially to the cell body 43 at an unknown angle $\Theta$ from the vertical or Y-axis of reference, it is desired to ascertain both the magnitude of the force and its angle of application. The force F produces shear strain in the cell body 43 in the general manner illustrated in FIG. 6, but due to the angularity of application, the first and second sets of gages are affected not in proportion to the total force F, but rather in proportion to the latter's vertical and horizontal components Fy and Fx respectively, as indicated in FIG. 10. Employing the usual rectangular coordinate convention as noted, Fy=Fcos $\Theta$, Fx=Fsin $\Theta$, while $\Theta=\tan^{-1}$ Fx /Fy. From these relationships, and further pursuant to the usual trigonometrical process, it will be evident that $\Theta=\tan^{-1}$ Fx /Fy (the angle whose tangent is Fx /Fy), F=Fx cosecant $\Theta$, or, F=Fy secant $\Theta$).

Since in each case the essential related quantities Fx and Fy are displayed or presented simultaneously by the X-meter 48 and the Y-meter 39 respectively, it is obvious that the device enables both the total magnitude of the force and the angle of its delivery to be readily ascertained or derived either by manual or automatic computation.

FIGS. 4 through 11 described two types of embodiments of the invention capable of providing instantaneous force measurement and monitoring of truck brakes. Since the load direction of the different brake system is not readily known, it is anticipated that initial instrumented anchor pin installations be that of the embodiment illustrated in FIG. 8. This embodiment is of the type that senses applied loads in two independent axes and is capable of determining the direction of the applied load. Using a reference line on the brake shoe, the magnitude and direction of the force component may be determined by the methods previously described. Once this force direction is determined, the types of embodiments described in FIG. 4 may also be used. These embodiments can be easily oriented with respect to the force by means of the anti-rotation plate 40. While either embodiment described is practical, the embodiment of FIG. 4 would tend to be of lesser cost and complication. Therefore, it is anticipated that the single axis instrumented pins are more suitable to commercial use, while the two-axis types of instrumented pins are used for establishing pin orientation or to conduct research and development.

Throughout the foregoing description it will have been noted that during its gaging operation the device functions also as an essential working part of the operating brake system in a vehicle being driven over the road itself rather that a mere attachment thereto. Thus instrumented anchor pins at all times sustain and transmit the entire actual working shear forces occurring during brake stops. The advantages achieved are self-evident, not only in point of simplicity and accuracy, but also in providing real time evaluation of brake performance and efficiency. With respect to the use of the load cell described herein either as a permanent substitute for the anchor pin which it replaces, the reduction in shear-resistant metal, due to the slightly reduced diameter of the zones 30 and 31 plus the presence of the relatively small central bore 32, is normally insufficient to be of any practical significance. However, if particular conditions call for a strict and very high factor of safety, the cell body obviously may be made of suitable material having sufficient additional intrinsic strength characteristics to fulfill the technical requirement.

For convenience in illustration, the line of reference or direction for the orientation of gages within the load cell bore in accordance with this invention has been taken as the vertical throughout FIGS. 4, 5, 8, etc., but obviously the sensitive planes, as determined by the circumferential positioning of the gages, may be arranged with respect to any other direction of reference which may be desired. Similarly, in addition to the 90-degree gage set spacing illustrated in FIGS. 8, 9, and 10, other circumferential spacing may be used if components of forces are required in other specific directions. In other words, while the invention has been set forth in typical preferred form, it is not limited to the precise embodiments illustrated, as various modifications may by made without departing from the spirit of invention as defined in the appended claims.

From what has been described, it will be understood by those of skill in this art that we have invented a method for use in connection with an operating vehicle being driven, having wheels and brakes in a brake system, of sensing and correcting brake function in said system, comprising the steps of: making force/torque measurements of particular wheels; systematically making wheel to wheel force/torque comparisons of those measurements during operation of said vehicle while it is moving and being driven and the brake system is operating, in order to determine whether there is any degradation in brake system performance; and then making corrective adjustments based on those comparisons.

Further, we invented using a means of correction verification to verify brake corrective adjustments through an additional processing following said corrective adjustments and a method of using a processing means to analyze and determine wheel to wheel force/torque comparisons and generate a warning when wheel to wheel comparisons become unbalanced to a predetermined reference value.

What is claimed is:

1. For use in connection with an operating vehicle being driven, having wheels and brakes in a brake system,
   a method of sensing and correcting brake function in said system, comprising the steps of:
       making force/torque measurements of particular wheels;
       systematically making wheel to wheel force/torque comparisons of those measurements during operation of said vehicle while said vehicle is moving and being driven and the brake system is operating, in order to determine whether there is any degradation in brake system performance;
       then making corrective adjustments based on those comparisons;
       and then using a means of correction verification to verify brake corrective adjustments through an additional processing following said corrective adjustments.

* * * * *